(12) United States Patent
McNutt et al.

(10) Patent No.: US 7,534,958 B2
(45) Date of Patent: May 19, 2009

(54) CABLE RETAINING SYSTEM

(75) Inventors: Patrick S. McNutt, Carnation, WA (US); Phillip Phung, Kirkland, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 669 days.

(21) Appl. No.: 11/375,685

(22) Filed: Mar. 14, 2006

(65) Prior Publication Data
US 2007/0031102 A1 Feb. 8, 2007

Related U.S. Application Data

(60) Provisional application No. 60/705,414, filed on Aug. 3, 2005.

(51) Int. Cl.
*H02G 3/04* (2006.01)
(52) U.S. Cl. ............... 174/68.1; 174/101; 174/135; 361/826; 211/26; 385/137; 439/76.1
(58) Field of Classification Search ................ 174/50, 174/60, 68.1, 101, 135, 72 A, 97, 68.3, 96; 361/731, 735, 826, 686, 733; 439/76.1, 540.1; 211/26; 360/234.3; 385/134–136, 137
See application file for complete search history.

(56) References Cited

U.S. PATENT DOCUMENTS

| 6,818,834 | B1 * | 11/2004 | Lin ........................ 174/135 |
| 7,119,282 | B2 * | 10/2006 | Krietzman et al. ......... 174/101 |
| 7,178,679 | B2 * | 2/2007 | Canty et al. ................. 211/26 |
| 7,207,835 | B2 * | 4/2007 | Levesque et al. ......... 439/540.1 |
| 7,362,941 | B2 * | 4/2008 | Rinderer et al. ............ 385/134 |
| 7,385,141 | B2 * | 6/2008 | Keith et al. ................. 174/135 |
| 7,437,048 | B2 * | 10/2008 | Farrell et al. ............... 385/135 |

* cited by examiner

*Primary Examiner*—Dhiru R Patel
(74) *Attorney, Agent, or Firm*—Davis Wright Tremaine LLP; George C. Rondeau, Jr.

(57) ABSTRACT

Cable retainer implementations of a cable retaining system for use with patch panels and other multiport communication equipment are discussed herein. The cable retainer implementations can be useful for supporting, ordering, and otherwise managing cables coupled to multiport equipment found installed in communication racks or in stand-alone applications. The multiport equipment typically includes patch panels and can include other types of multiport equipment as well including network hubs.

12 Claims, 21 Drawing Sheets

US 7,534,958 B2

CABLE RETAINING SYSTEM

BACKGROUND OF THE INVENTION

1. Field of the Invention

The present invention is generally related to cable management systems.

2. Description of the Related Art

Conventional racks can hold much equipment including patch panels and other equipment having many ports connected to various types of cables. The equipment can be used for telephony, networking, and other communication related applications using both fiber optic and wire cables. The amount and diversity of cables can pose serious challenges in managing such cables. Unfortunately, conventional solutions to such cable management challenges can present challenges of their own such as with insufficient access and/or high demands for space requirements.

BRIEF DESCRIPTION OF THE SEVERAL VIEWS OF THE DRAWING(S)

DETAILED DESCRIPTION OF THE INVENTION

Figure 1:
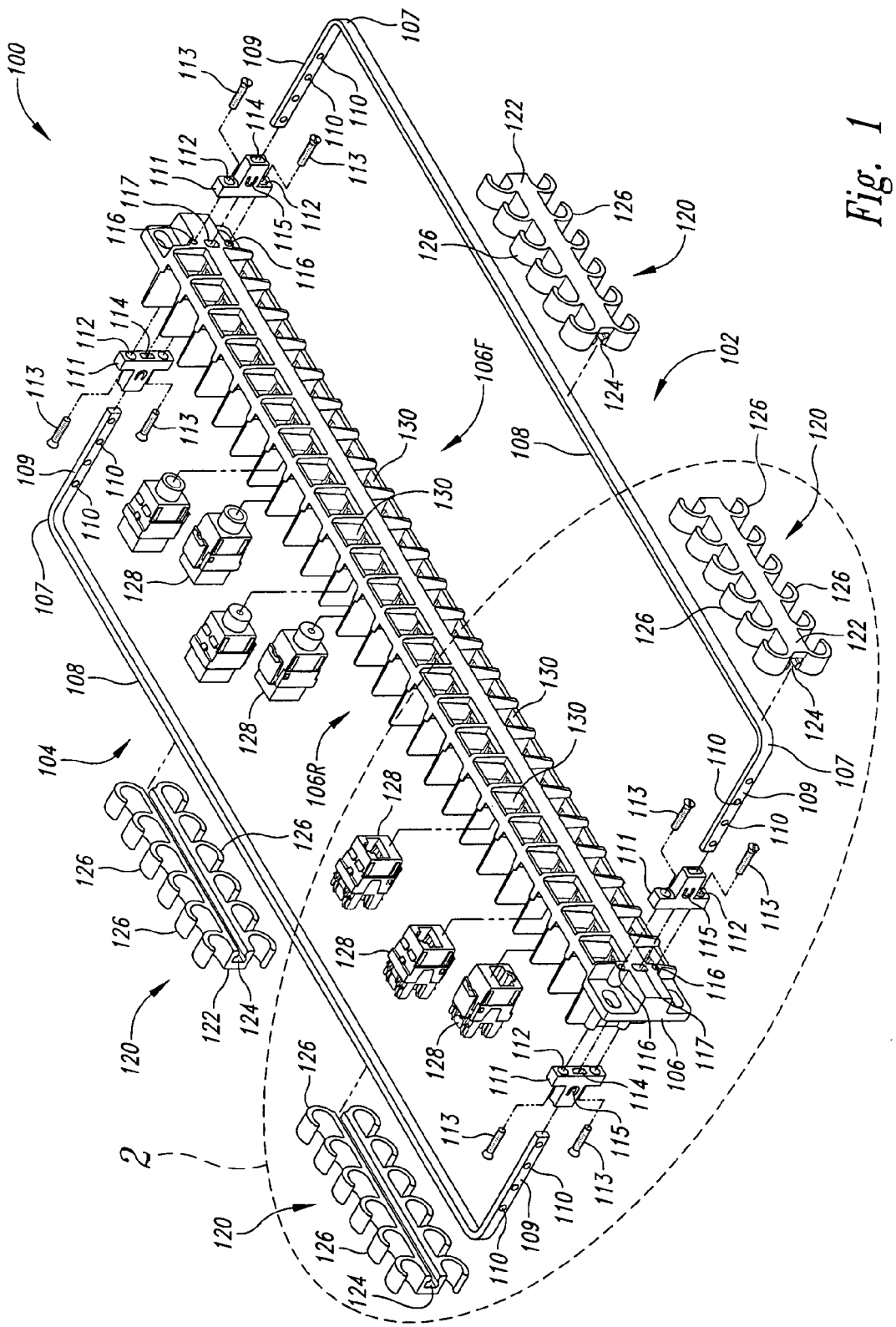
FIG. 1 is an exploded isometric front view of a first implementation of the cable retaining system with a cable retainer front and a first cable retainer rear shown with a first patch panel.
Figure 2:
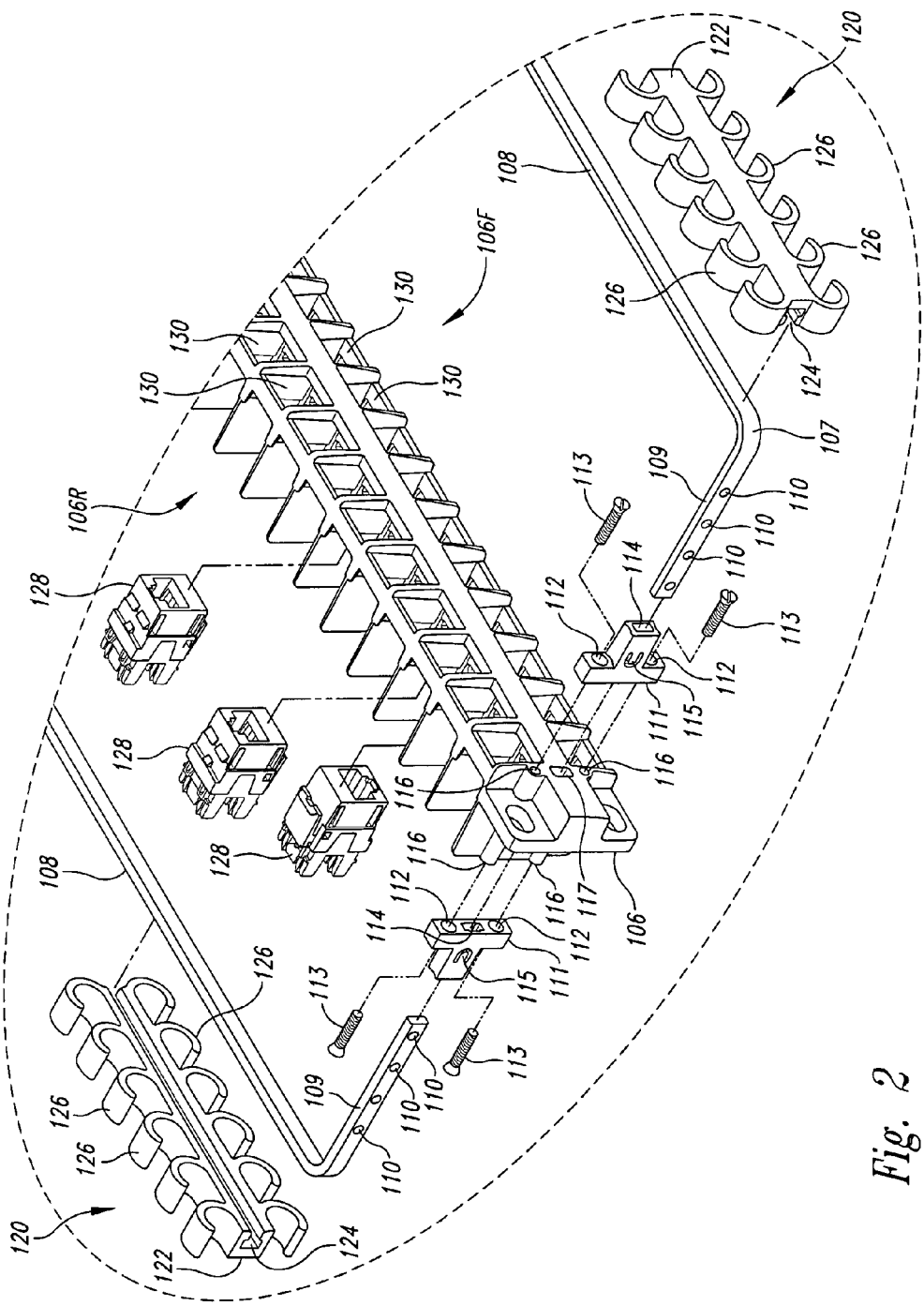
FIG. 2 is an enlarged portion of the exploded isometric front view of the first implementation of FIG. 1.
Figure 3:
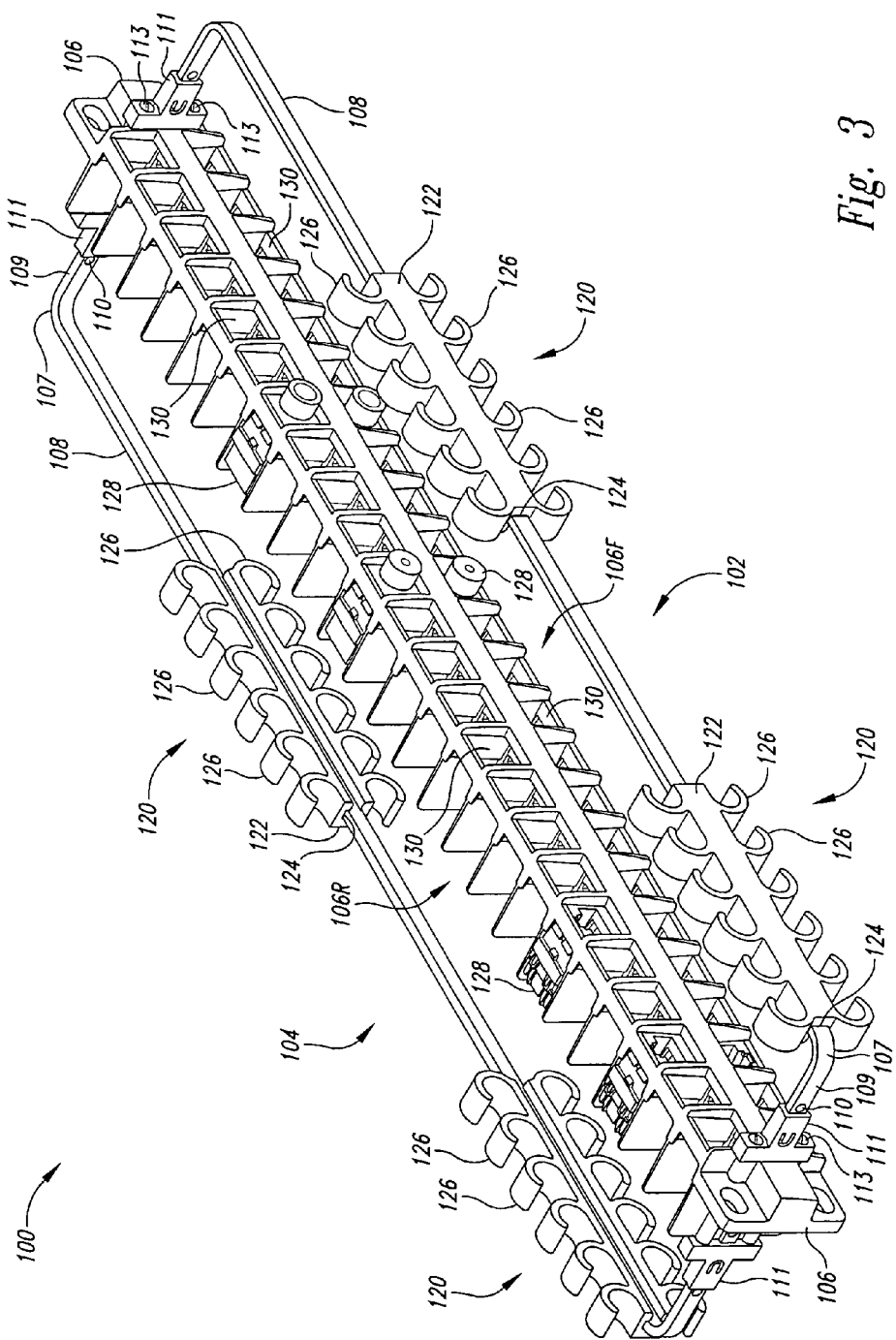
FIG. 3 is an isometric front view of the first implementation of FIG. 1 as assembled.

Cable retainer implementations of a cable retaining system for use with patch panels and other multiport communication equipment are discussed herein. The cable retainer implementations can be useful for supporting, ordering, and otherwise managing cables coupled to multiport equipment found installed in communication racks or in stand-alone applications. The multiport equipment typically includes patch panels and can include other types of multiport equipment such as network hubs.

A first implementation 100 of a cable retaining system including a first front cable retainer 102 and a first rear cable retainer 104 with a first patch panel version 106, having a front 106F and a rear 106R, is shown in FIGS. 1-7. The first front retainer 102 is configured for attachment to the front 106F of the first patch panel 106 and the first rear retainer 104 is configured for attachment to the rear 106R of first patch panel. The first front retainer 102 and the first rear retainer 104 each have a bar 107 with a lateral portion 108 extending between two extension portions 109. The extension portions 109 each have a series of holes 110. Each of the extension portions 109 engages with a bracket 111. The bracket 111 has two holes 112 for mounting to multiport equipment such as the first patch panel 106 using mounting threaded fasteners 113 such as machine screws or bolts. The bracket 111 also has a through-hole or opening 114 for receiving the extension portions 109 therein.

The bracket 111 has snap fingers or bearings 115, each with a protrusion that engages with one of the holes 110 when the bar 107 is inserted a sufficient distance into the through hole 114 of the bracket. The snap bearings 115 are tensioned a sufficient amount to prevent the bar 107 from inadvertently sliding in or out of the bracket 111, but are not tensioned so much as to not allow a user to slide the bar in or out of the bracket as desired. The series of the holes 110 on each extension portion 109 allows a user to select to what extent the lateral portion 108 of the bar 107 is positioned away from the multiport equipment such as the first patch panel 106.

The multiport equipment such as the first patch panel 106 has threaded holes 116 to receive the threaded fasteners 113 for mounting the first front retainer 102 and the first rear retainer 104 to the first patch panel. The first patch panel 106 has openings 117 to receive the extension portions 109 that may extend inward beyond the bracket 111. In alternative implementations, snap bearings 115 can be positioned inside of the through holes 114 rather than on the bracket 111 to engage with the holes 110 of the extension portions 109. Alternatively, the snap bearings can be mounted on the extension portions 109 of the bar 107, and the series of the holes 110 within the bracket 111. In other alternative implementations, other sorts of spring loaded protrusions or other style connections can be used instead of snap bearings.

When only with one of the first front retainer 102 and the first rear retainer 104 is mounted to the first patch panel 106, the bar 107 of the mounted retainer may be slid farther into the first patch panel 106 than if both the first front retainer and the first rear retainer were simultaneously mounted, each with a bar 107. The bracket 111 and the first patch panel 106, however, are sufficiently dimensioned to allow for both the first front retainer 102 and the first rear retainer 104 to be simultaneously mounted to the first patch panel 106 with a bar 107.

The first front retainer 102 and the first rear retainer 104 further include cable stays 120, each having an elongated strip member 122 with a lateral groove 124 and cable clamps 126 fixedly attached to the strip member. Other implementations used other couplers that are engageable with cables to couple the cables with the bar 107. The lateral groove 124 of each cable stay 120 is sized to removably and slidably engage with the lateral portion 108 of the bar 107. As such, the cable stays 120 can be slidably positioned along the length of the lateral portion 108 as desired to locate the cables stays on the lateral portion at desired locations.

Each cable stay 120 is shown to include twelve cable clamps 126, however, in other implementations the number of the cable clamps can be different for the cables stays. In some implementations, the cable stays 120 or various of the cable clamps 126 can be labeled with various colors, patterns, alphanumeric symbols or other symbology, or otherwise marked to indicate the type of cable that the cable stay and/or cable clamp is capable of retaining. In some implementations associated cable can be similarly marked to match the marking the cable stays 120 and cable clamps 126 with which compatible. In alternative implementations, another type of member other than the bar 107 can be used to support the cable stays 120.

The first patch panel 106 is representative of a multiport device, which can be included in the retaining system 100, however, in other versions of the retaining system, other types of multiport devices can be involved. Consequently, the openings 117 can also be found in other multiport equipment besides the first patch panel 106 shown in FIGS. 1 and 2. The first patch panel 106 is shown to further include connectors 128 that removably engage with port openings 130 of the first patch panel.

Figure 4:
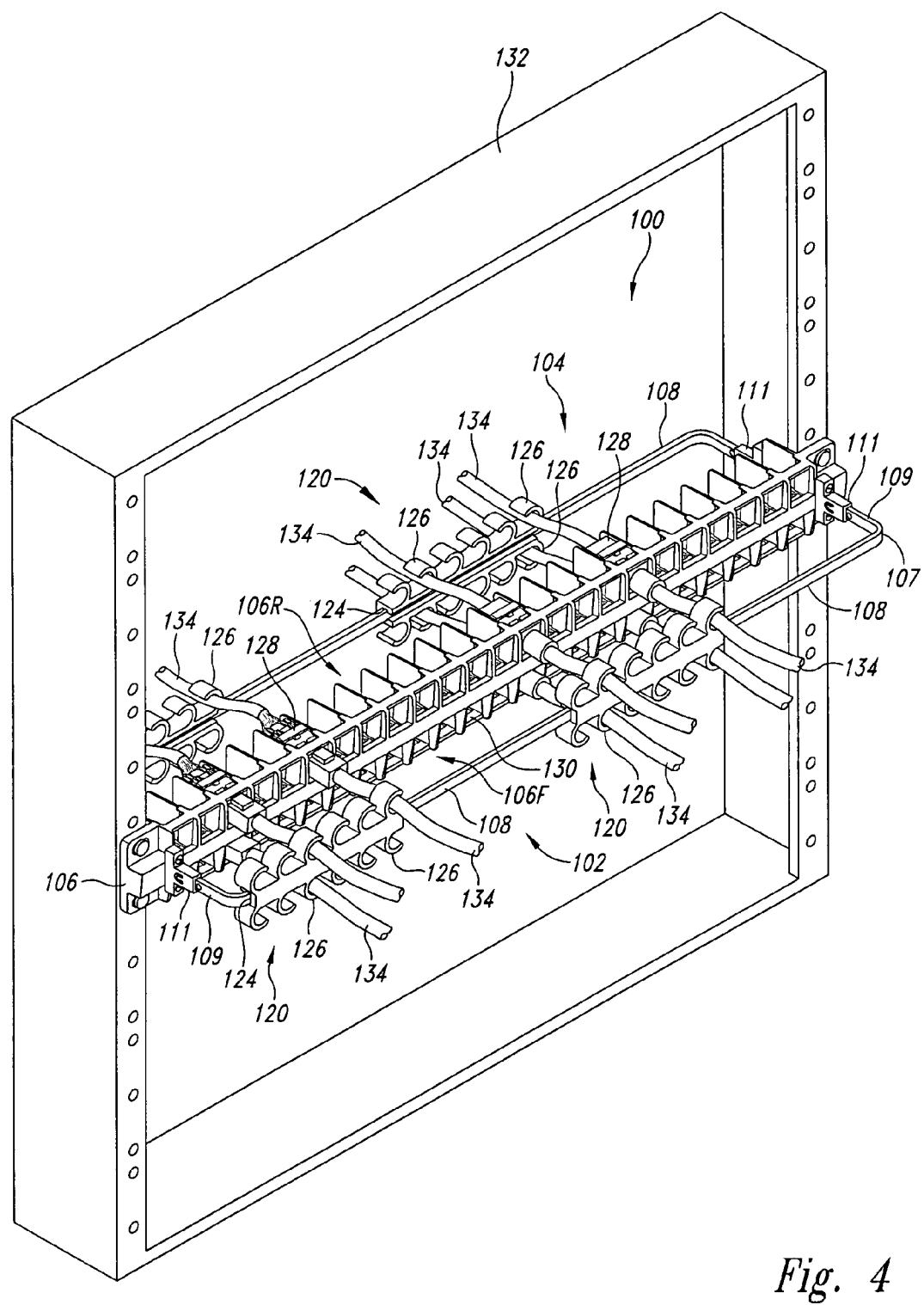
FIG. 4 is an isometric front view of the first implementation of FIG. 1 as installed in a communication rack.

The first front retainer 102 and the first rear retainer 104 coupled to the first patch panel 106 is shown in FIG. 4 as installed in a communication rack 132. Cables 134 are shown coupled to the first patch panel 106 and being secured by the cables stays 120 attached to the first front retainer 102 and the first rear retainer 104. The cable clamps 126 are positioned on the cable stays 120 to receive the cables 134 both above and below the first front retainer 102 and the first rear retainer 104, thereby providing enhanced support for high-density port configurations such as shown with the first patch panel 106.

Figure 5:
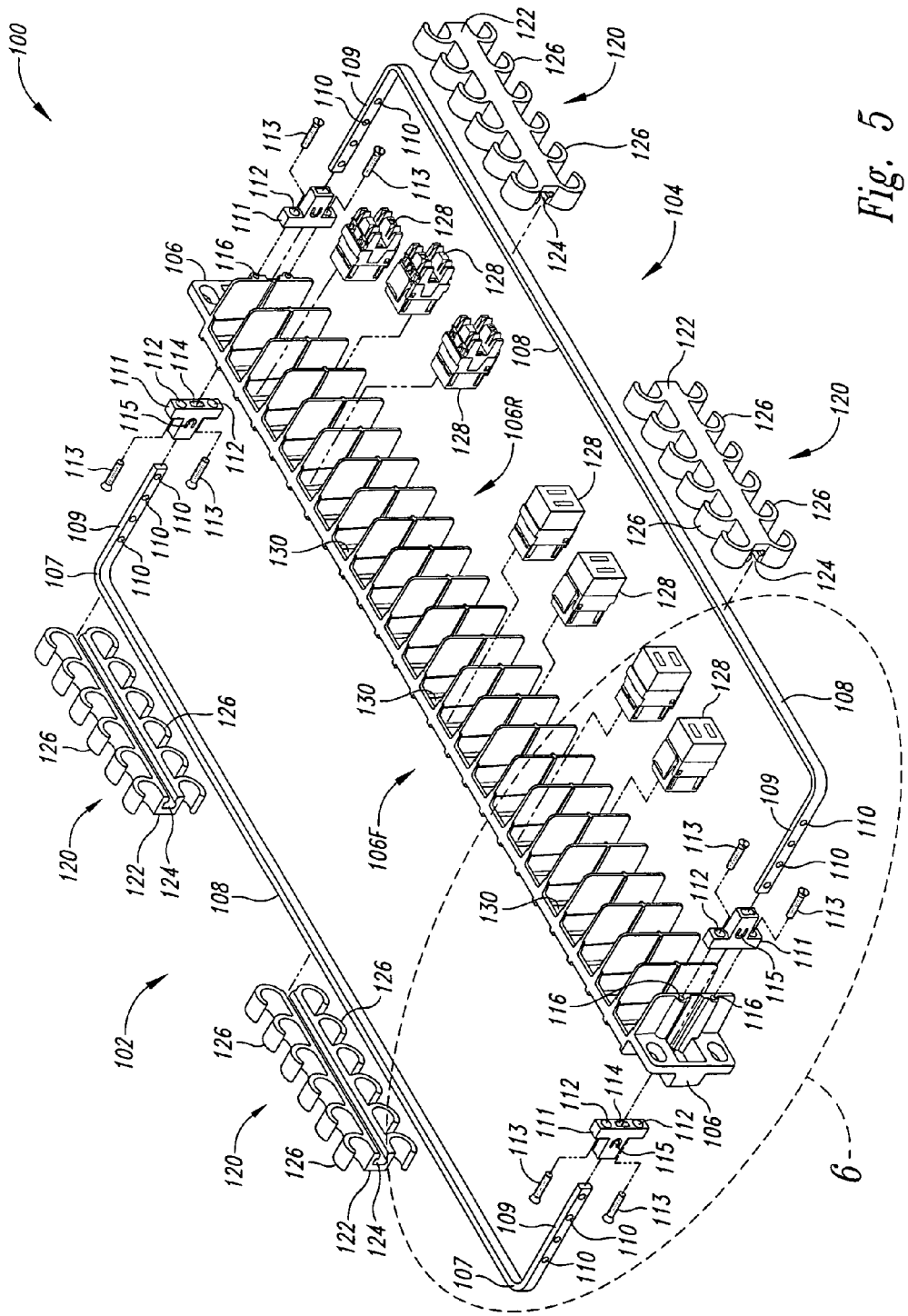
FIG. 5 is an exploded isometric rear view of the first implementation of FIG. 1.
Figure 6:
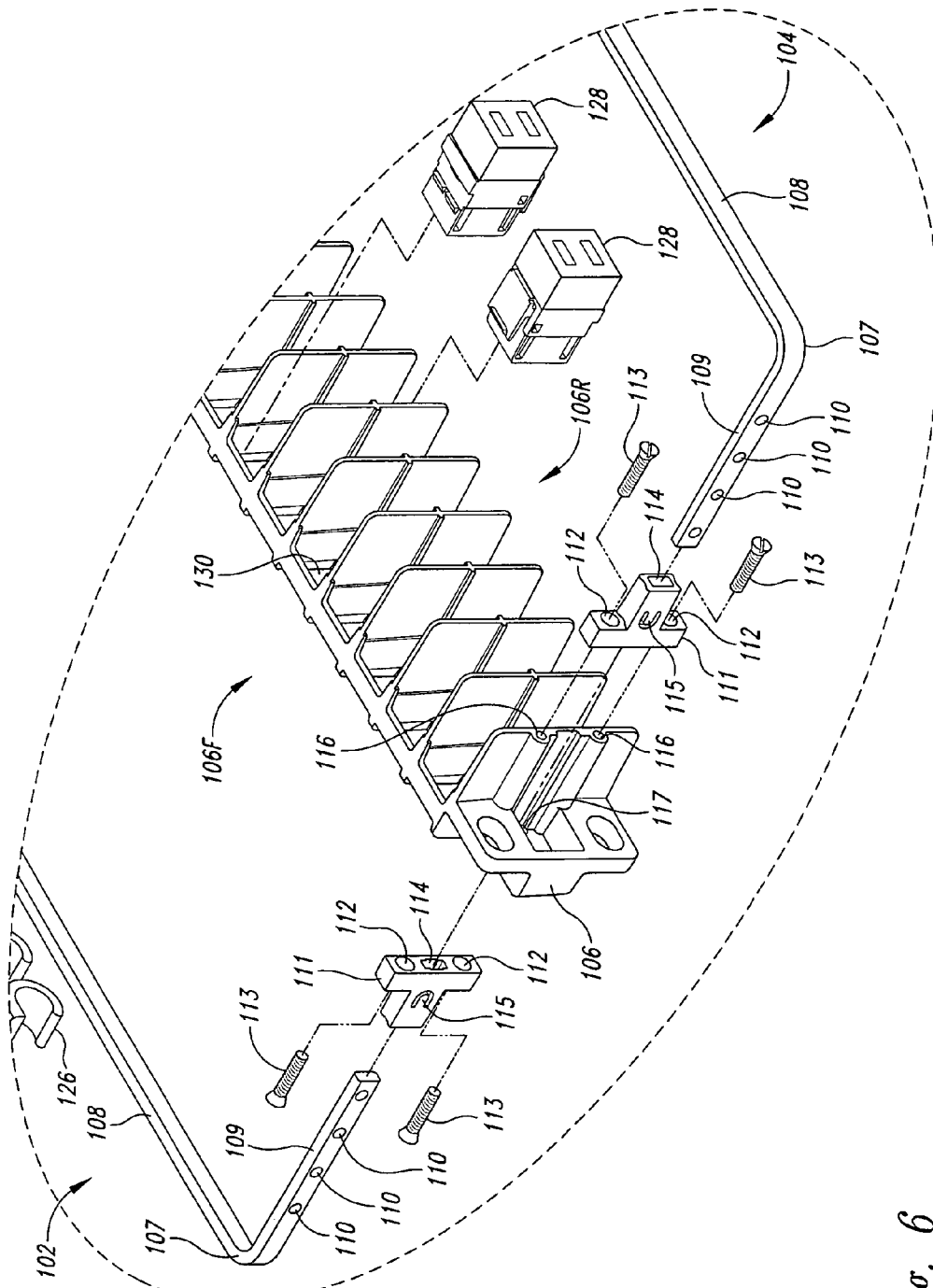
FIG. 6 is an enlarged portion of the exploded isometric rear view of FIG. 5 of the first implementation.
Figure 7:
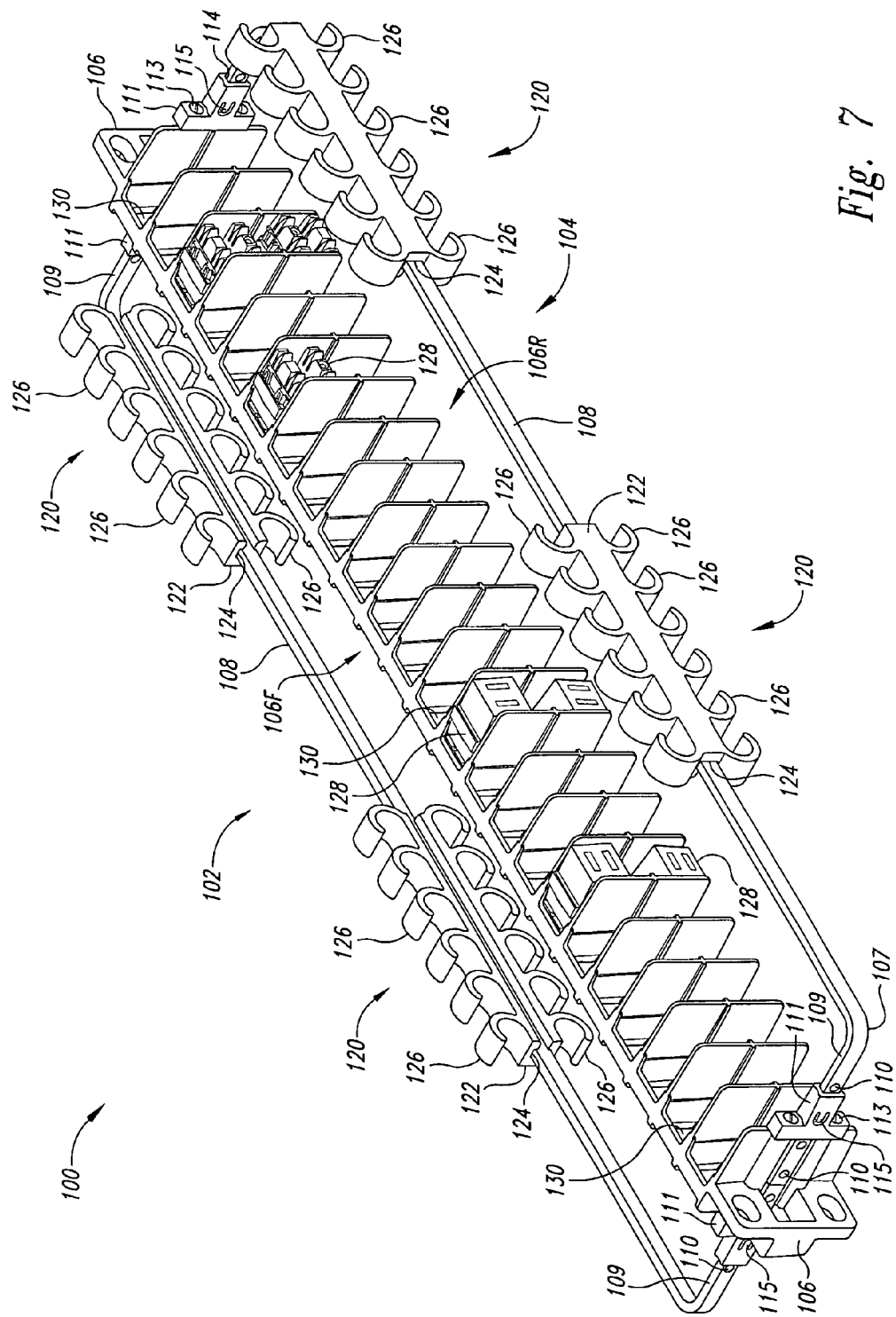
FIG. 7 is an isometric rear view of the first implementation of FIG. 5 as assembled.
Figure 8:
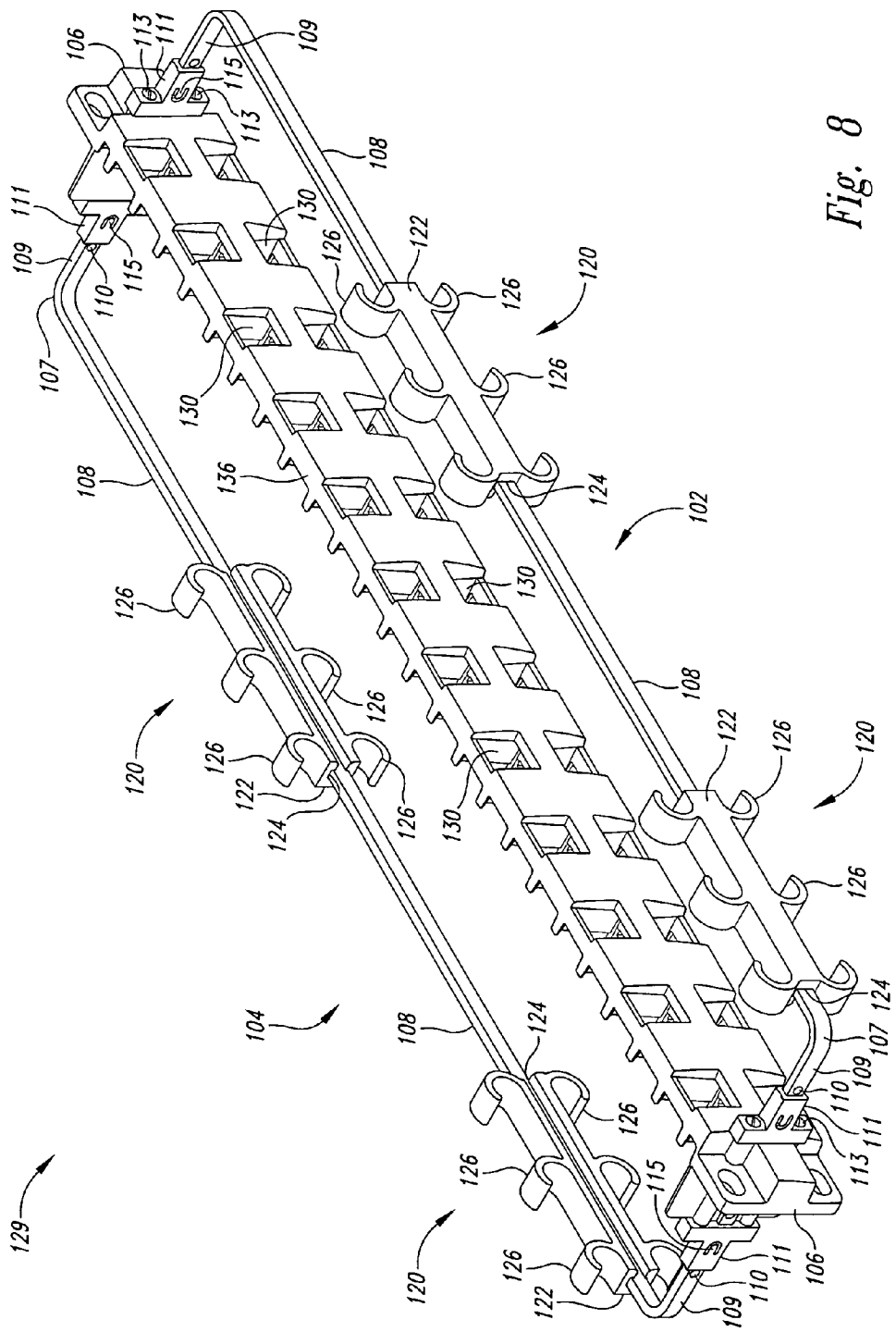
FIG. 8 is an isometric front view of a second implementation of the cable retaining system.
Figure 9:
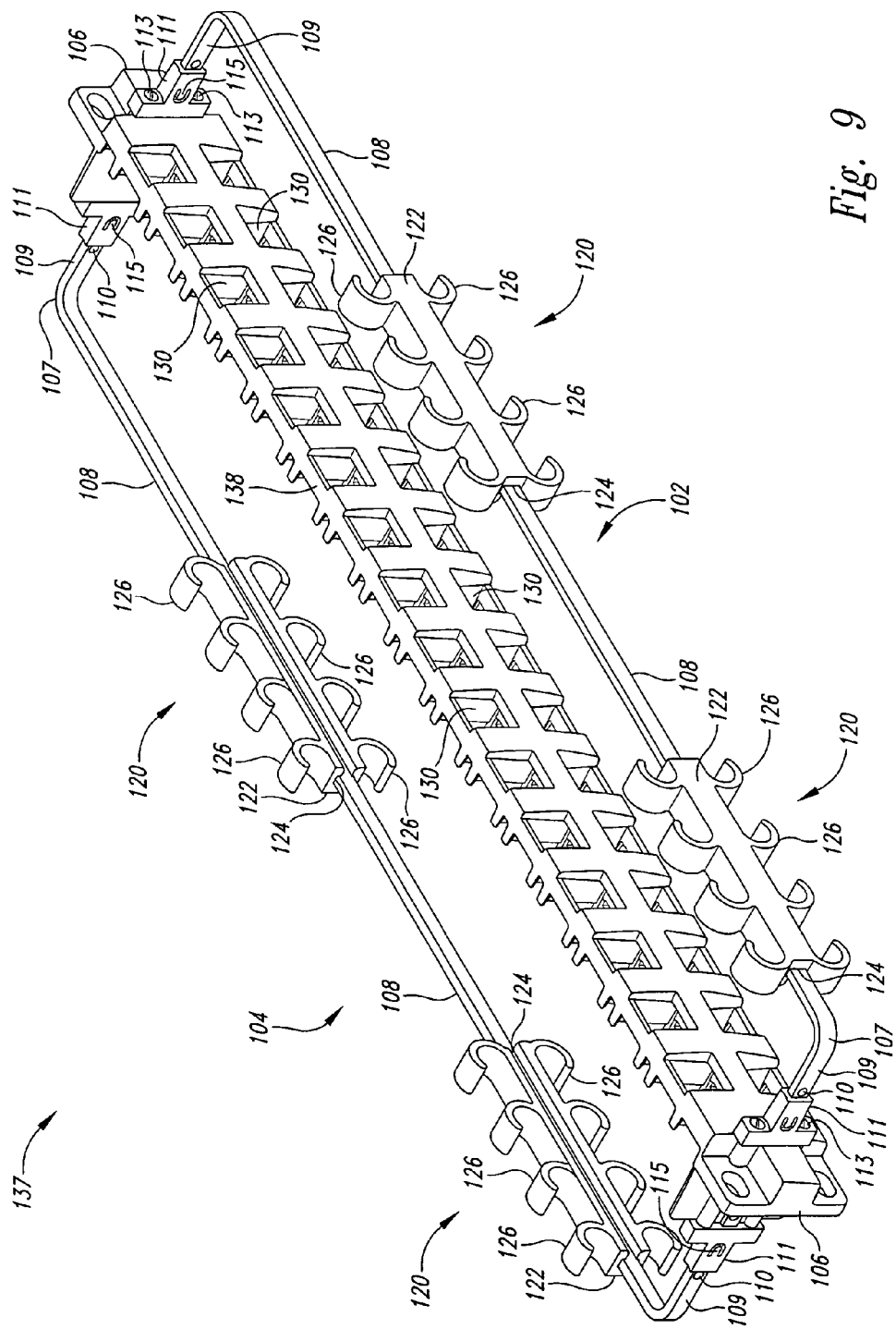
FIG. 9 is an isometric front view of a third implementation of the cable retaining system.

A rear view of the first front retainer 102 and the first rear retainer 104 are shown with the first patch panel 106 in FIGS. 5-7. A second implementation 129 of the cable retaining system with the first front retainer 102 and the first rear retainer 104 is shown in FIG. 8 as being mounted to a second patch panel 136. A third implementation 137 of the cable retaining system with the first front retainer 102 and the first rear retainer 104 is shown in FIG. 9 as being mounted to a third patch panel 138. The second patch panel 136 and the third patch panel 138 differ from each other, and from the first patch panel 106 with respect to port densities among other things. These examples are provided to show that in general implementations of the retaining system 100 can be used for a wide variety of equipment connectable to cables.

Figure 10:
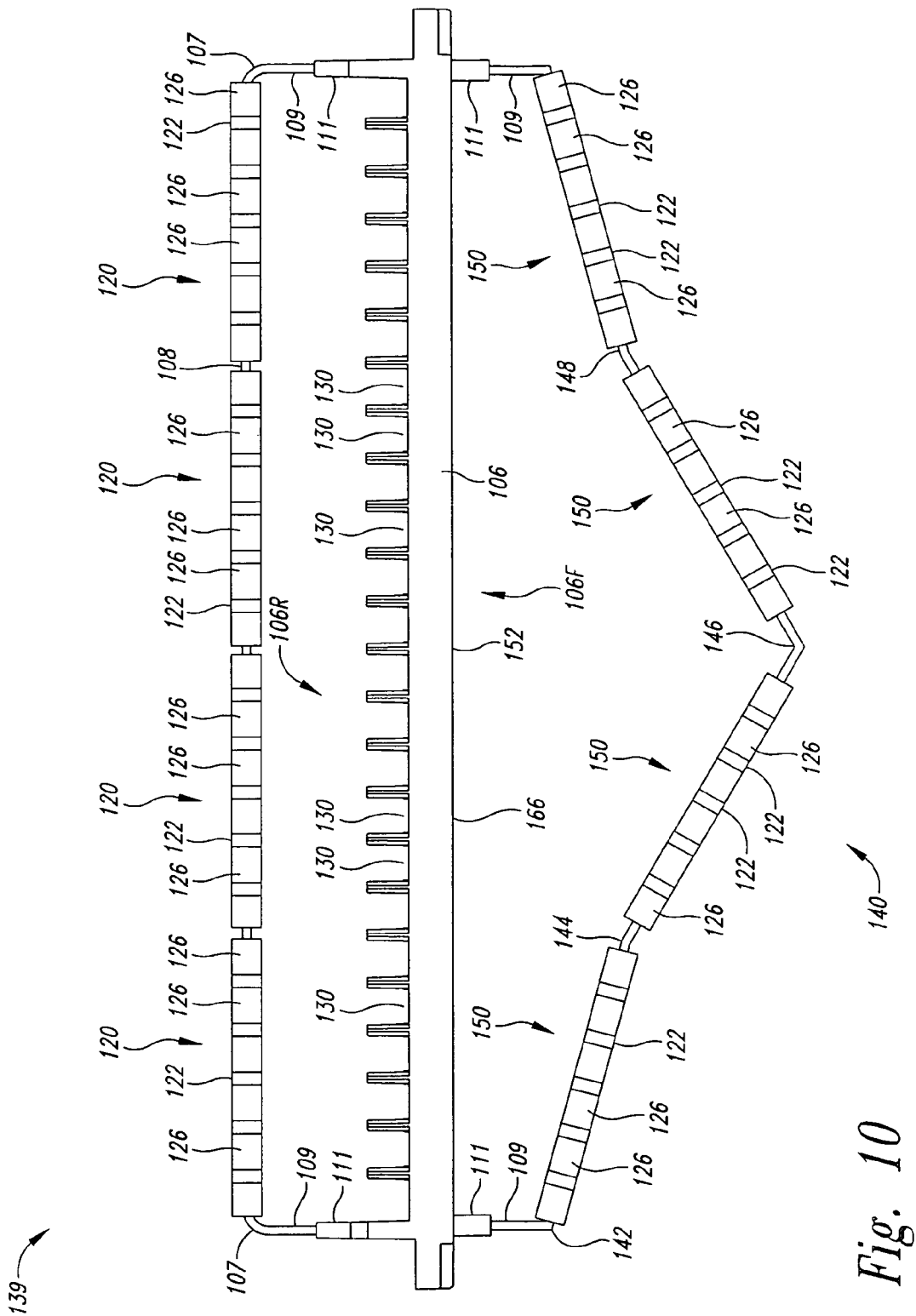
FIG. 10 is a top plan view of a fourth implementation of the cable retaining system.

A fourth implementation 139 of the cable retaining system with a second front retainer 140 is shown in FIG. 10 as having a second bar 142 with a first bend 144, a second bend 146, and a third bend 148 providing angled portions 150 of the second bar angled at an angle between 0 and 180 degrees to each other. The angled portions 150 can be used to direct the cables 134 away from a center portion 152 of multiport equipment such as the first patch panel 106.

Figure 11:
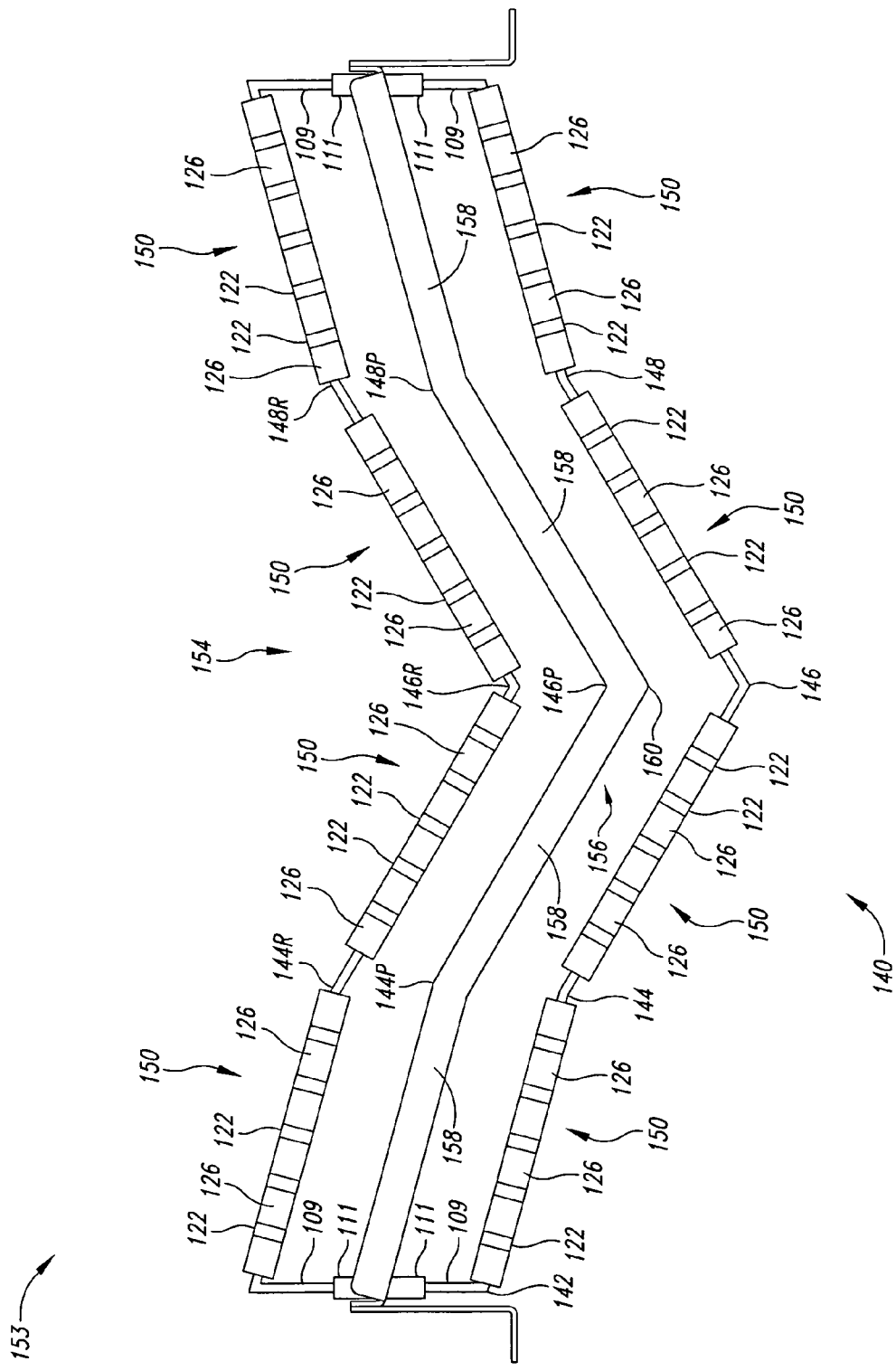
FIG. 11 is a top plan view of a fifth implementation of the cable retaining system.

A fifth implementation 153 of the cable retaining system with the second front retainer 140 is shown along with a second rear retainer 154 with a fourth patch panel 156 in FIG. 11. The second rear retainer 154 is angled at a first band 144R, a second bend 146R, and a third bend 148R substantially as the mirror image of the second front retainer 140 having the first bend 144, the second bend 146, and the third bend 148, respectively, to follow a profile provided by the fourth patch panel 156 having a first bend 144P, a second bend 146P, and a third bend 148P, respectively. The fourth patch panel 156 has angled portions 158 to help direct the cables 134 away from a center portion 160 of the fourth patch panel. The second front retainer 140 and the second rear retainer 154 are angled to be substantially aligned with the angled portions 158 of the second patch panel 156 to further help direct the cables 134.

Figure 12:
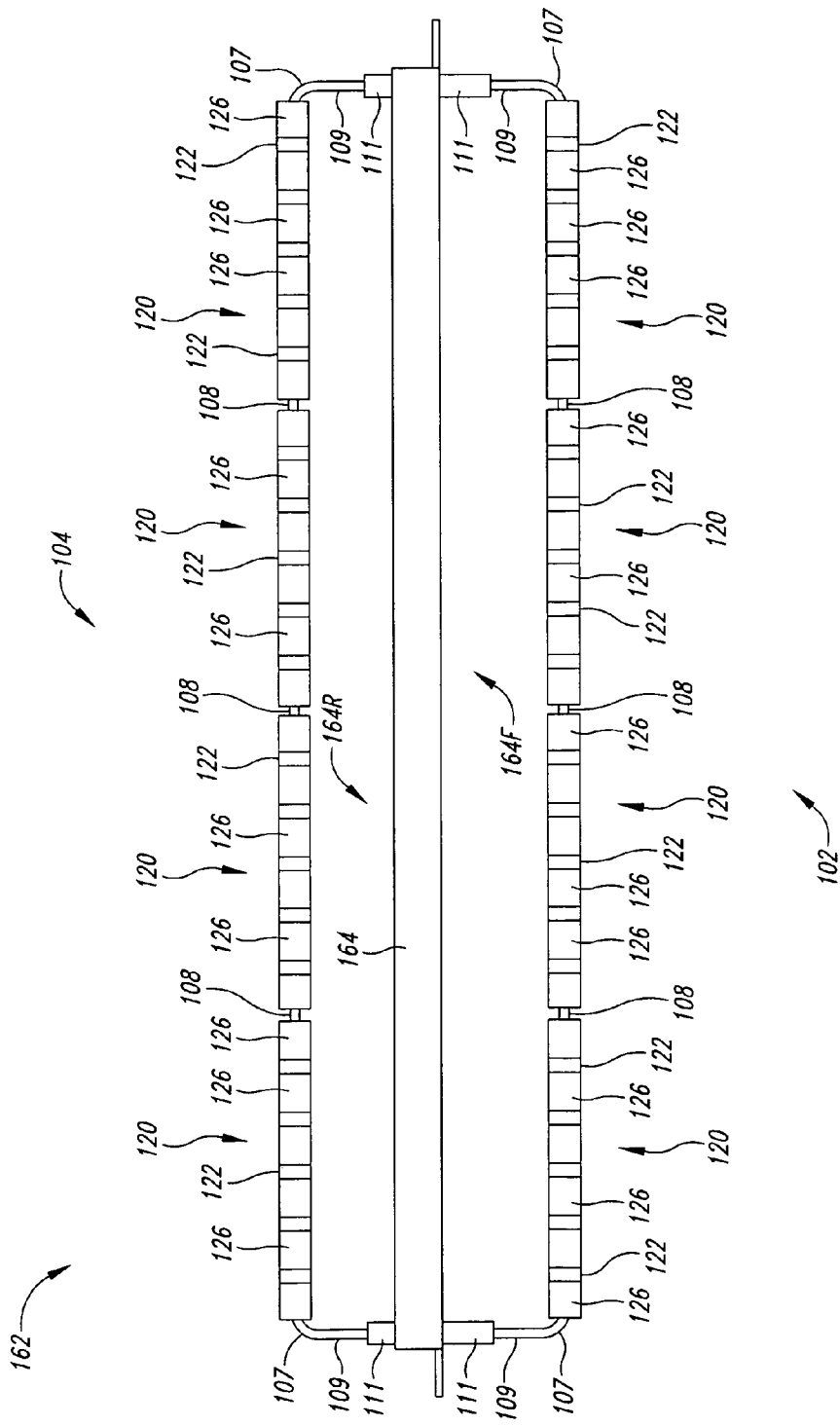
FIG. 12 is a top plan view of a sixth implementation of the cable retaining system.

A sixth implementation 162 of the cable retaining system is shown in FIG. 12 having a fifth patch panel 164 having a conventional front 164F and in a conventional rear 164R. The sixth implementation 162 uses the first front retainer 102 and the first rear retainer 104 for supporting cables coupled to the front 164F and the rear 164R.

Figure 13:
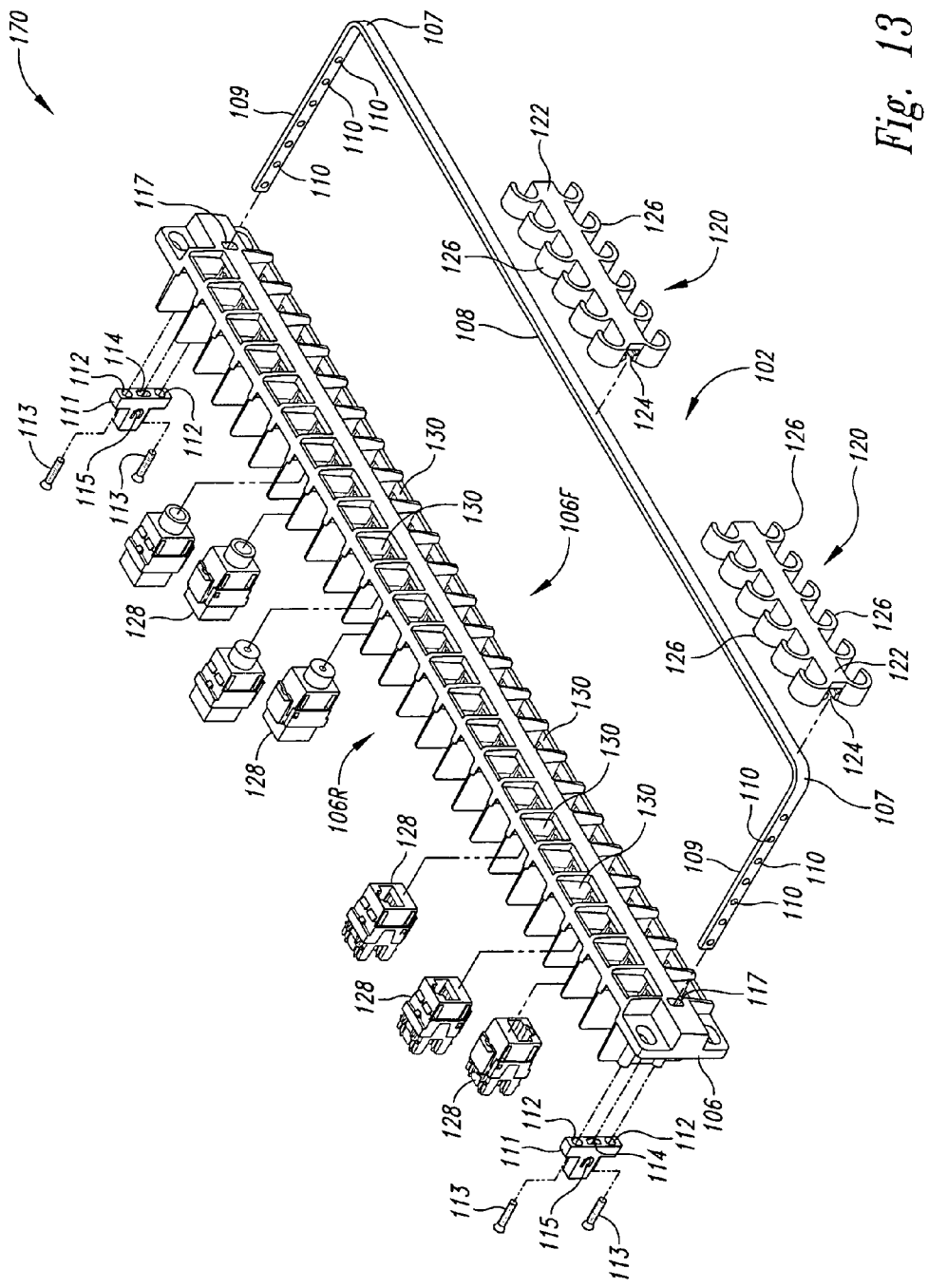
FIG. 13 is an exploded isometric front view of a seventh implementation of the cable retaining system.
Figure 14:
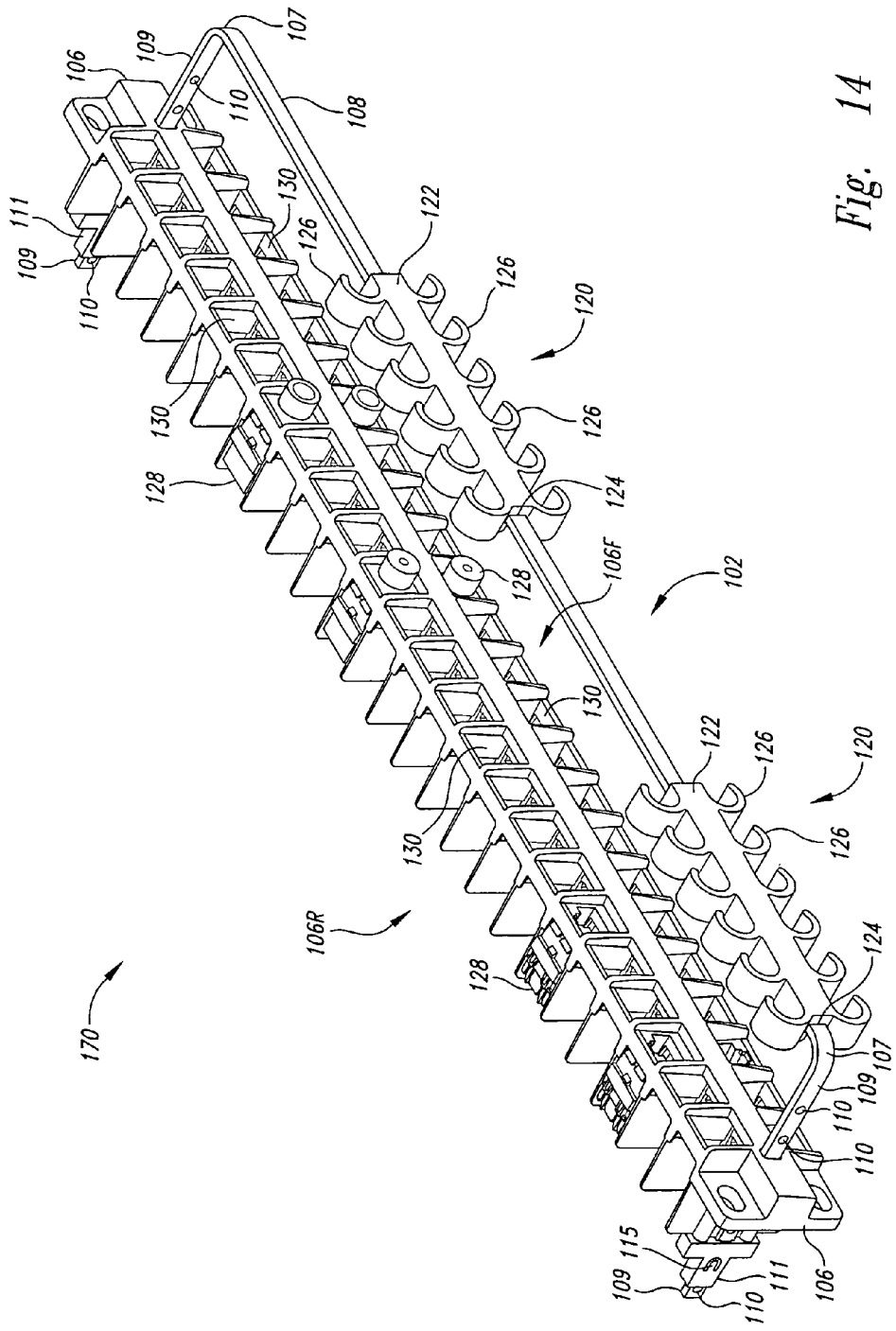
FIG. 14 is an isometric front view of the seventh implementation of the cable retaining system of FIG. 13 as assembled.

A seventh implementation 170 of the cable retaining system is shown in FIG. 13 and FIG. 14 as a variation of the first implementation 100 wherein the bracket 111, supporting the first front retainer 102, is mounted on the rear 106R of the first patch panel 100. In this seventh implementation 170 the extension portions 109 of the bar 107 protrude through the openings 117 of the first patch panel 100 to engage with the bracket 111.

Figure 15:
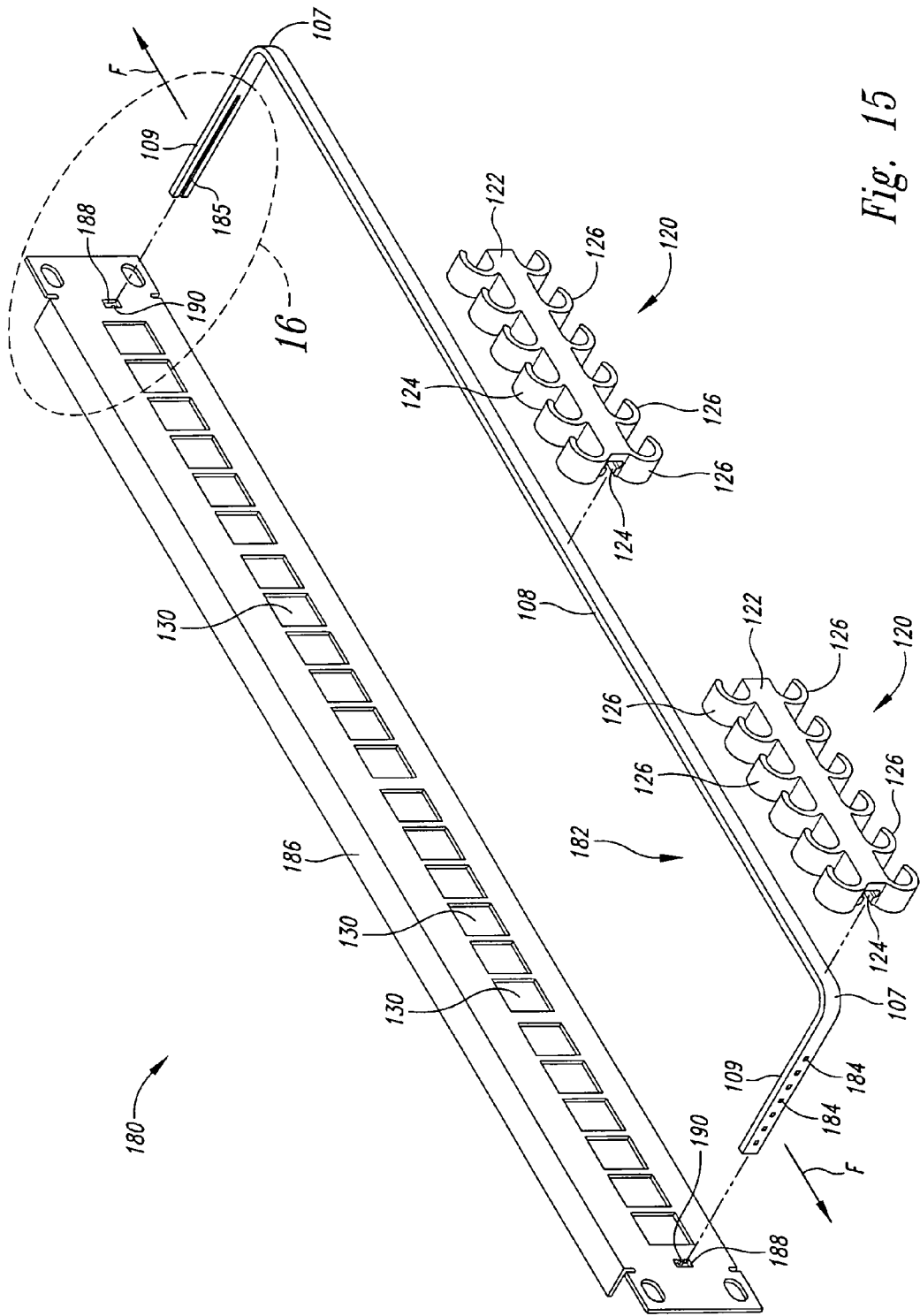
FIG. 15 is an exploded isometric front view of an eighth implementation of the cable retaining system.
Figure 16:
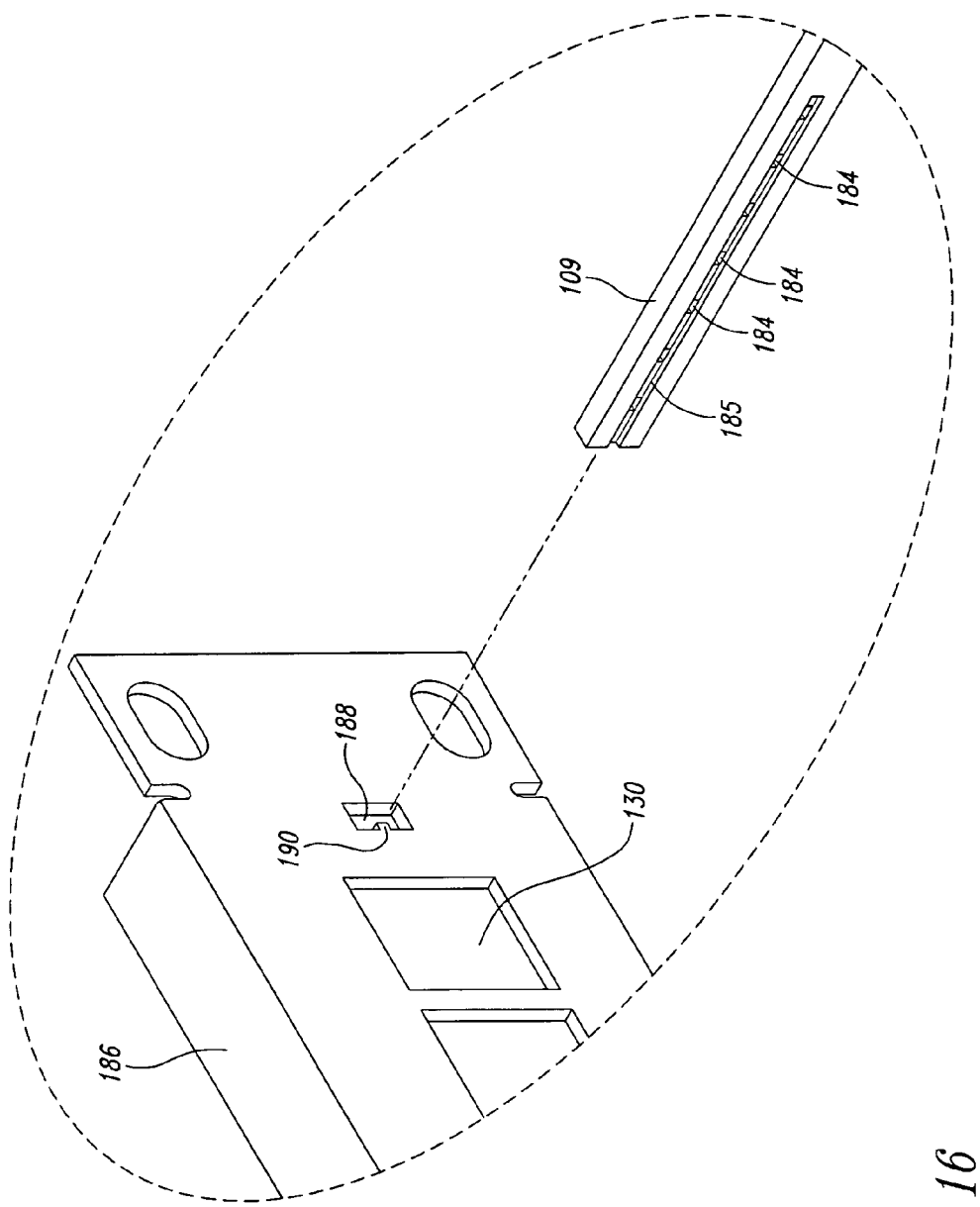
FIG. 16 is an enlarged portion of the exploded isometric front view of the eighth implementation of FIG. 15.
Figure 17:
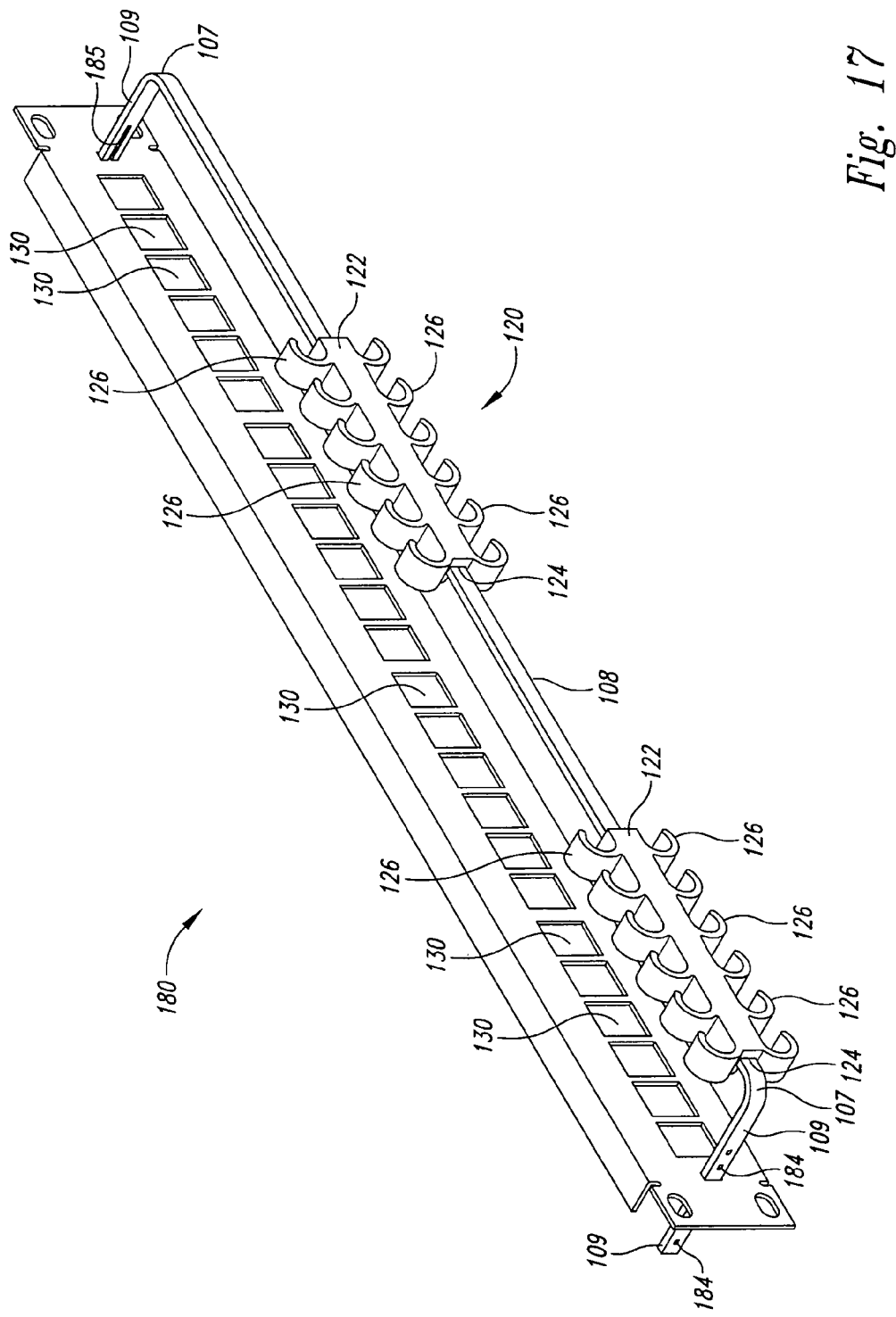
FIG. 17 is an isometric front view of the eighth implementation of FIG. 15 as assembled.

An eight implementation 180 of the cable retaining system is shown in FIGS. 15-17 in which the extensions 109 of the bar 107 each have a series of holes 184 therethrough and a groove 185 on a laterally inward side of the extension generally coextensive with the series of holes. The bar 107 of this eight implementation is constructed to engage a sixth patch panel 186 having openings 188 sized to receive the extensions 109. A laterally outward projecting tab 190 is positioned in each opening 188 to fit within the groove 185 of the corresponding extension 109 inserted into the opening 188. The tabs 190 are sized to removably fit within selected holes of the series of holes 184 of the extensions 109 to lock the bar 107 in position relative to the sixth patch panel 186 when inserted a desired distance into the openings 188.

In this eight implementation 180, the bar 107 is formed so that the extension portions 109 are positioned slightly outward more than perpendicular to the lateral portion 108. A slight laterally outward force, F, on each of the extensions 109 will bring them perpendicular to the lateral portion 108 so that the extensions can be inserted into one of the openings 188. The bar 107 has sufficient resiliency such that the extensions 109 when so moved laterally outward will tend to move laterally inward when the outward force, F, is removed. To engage one of the holes 184 with one of the tabs 190, when the extensions 109 are inserted at about the desired distance into the openings 188 to position the lateral portion 108 at about the desired distance from the face of the sixth patch panel 186, the outward force, F, is removed from the extensions 109 and the bar 107 is slid either slightly further into or out of the opening 188 until the tab snap seats into the hole.

Figure 18:
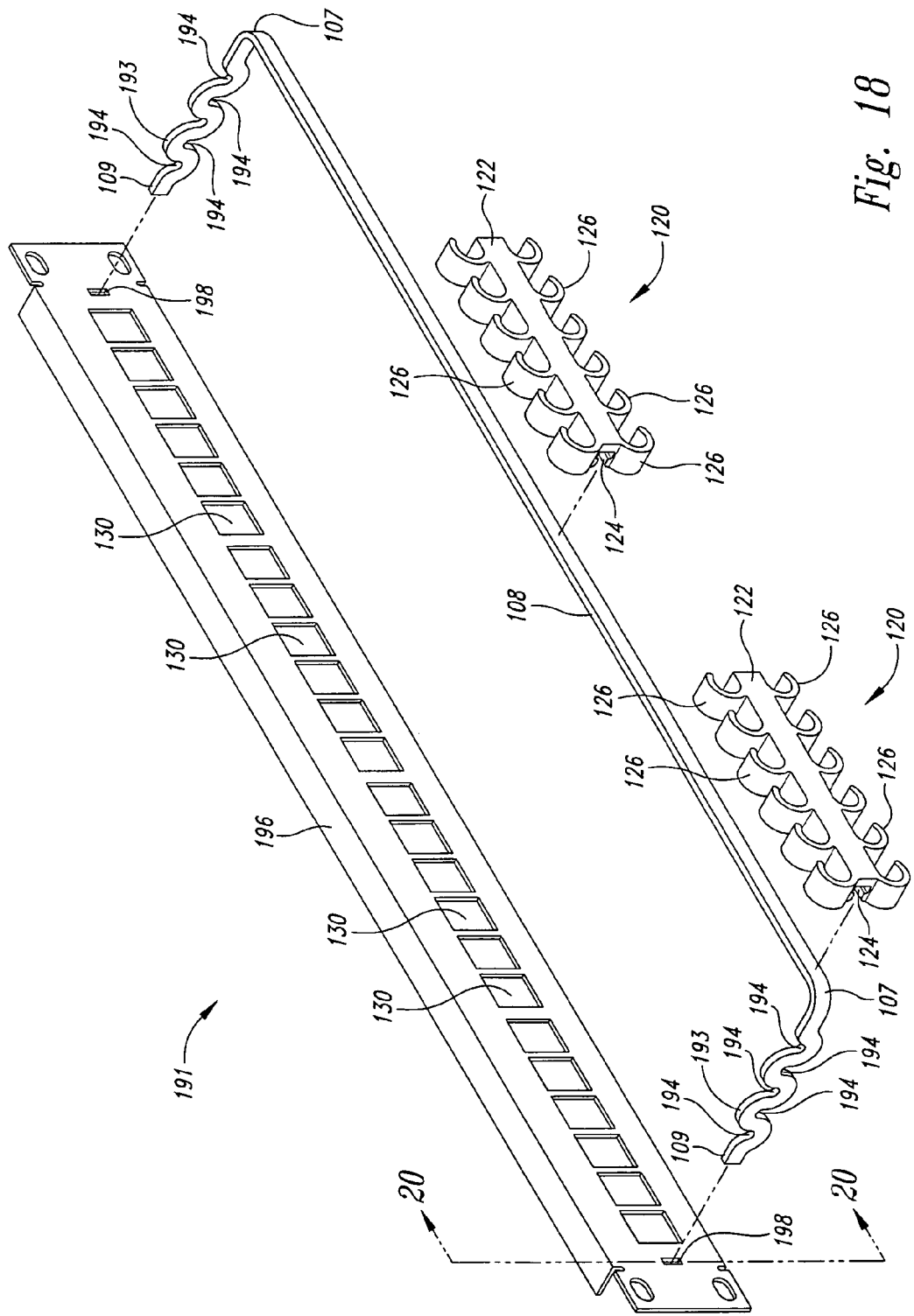
FIG. 18 is an exploded isometric front view of a ninth implementation of the cable retaining system.
Figure 19:
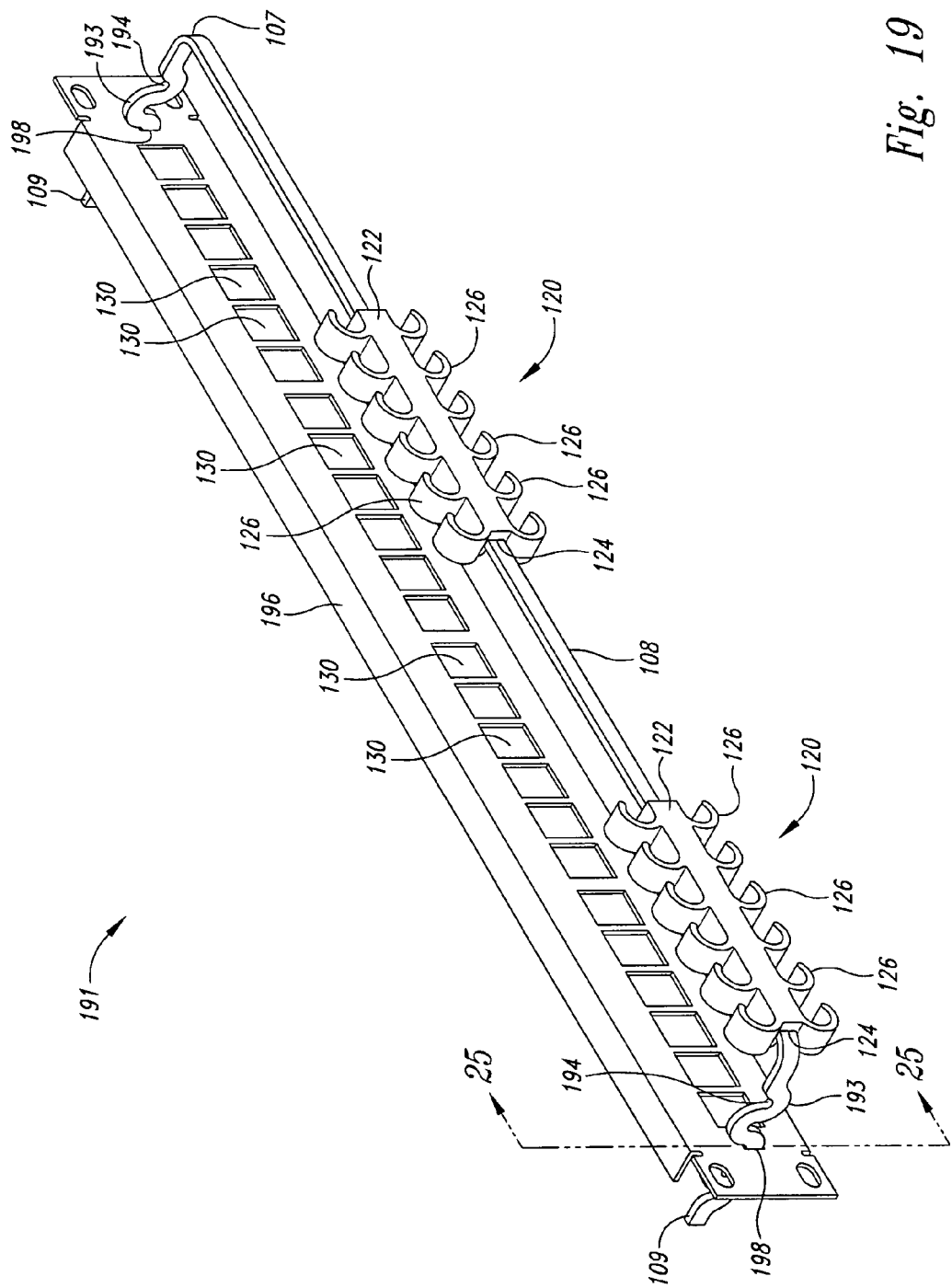
FIG. 19 is an isometric front view of the ninth implementation of the cable retaining system as assembled.
Figure 20:
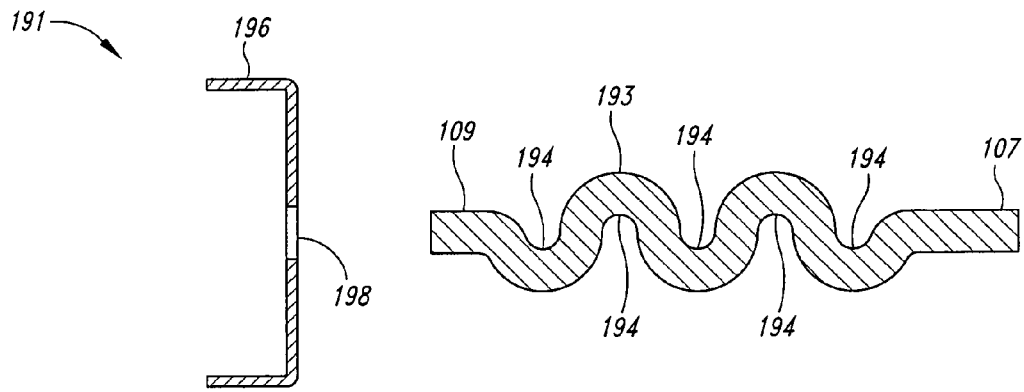
FIG. 20 is a side elevational view showing the retaining bar of the ninth implementation about to be coupled with the patch panel of the ninth implementation.
Figure 21:
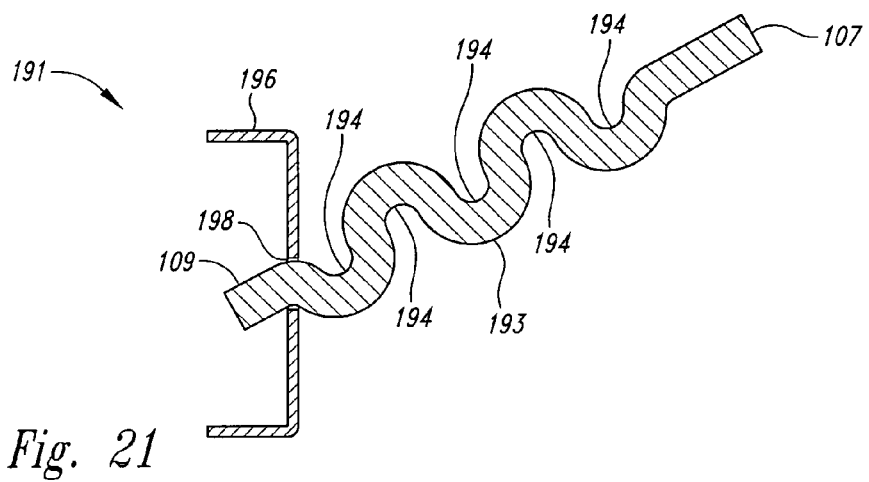
FIG. 21 is a side elevational view showing the retaining bar of the ninth implementation initially being inserted into the patch panel of the ninth implementation.
Figure 22:
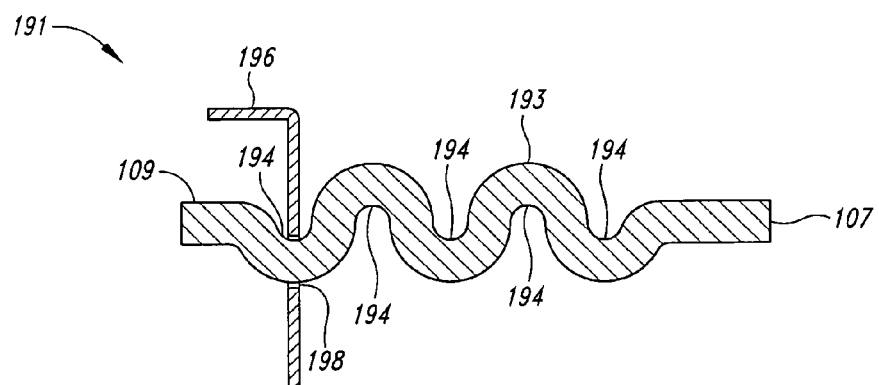
FIG. 22 is a side elevational view showing a first slot of the retaining bar of the ninth implementation being coupled with the patch panel of the ninth implementation.
Figure 23:
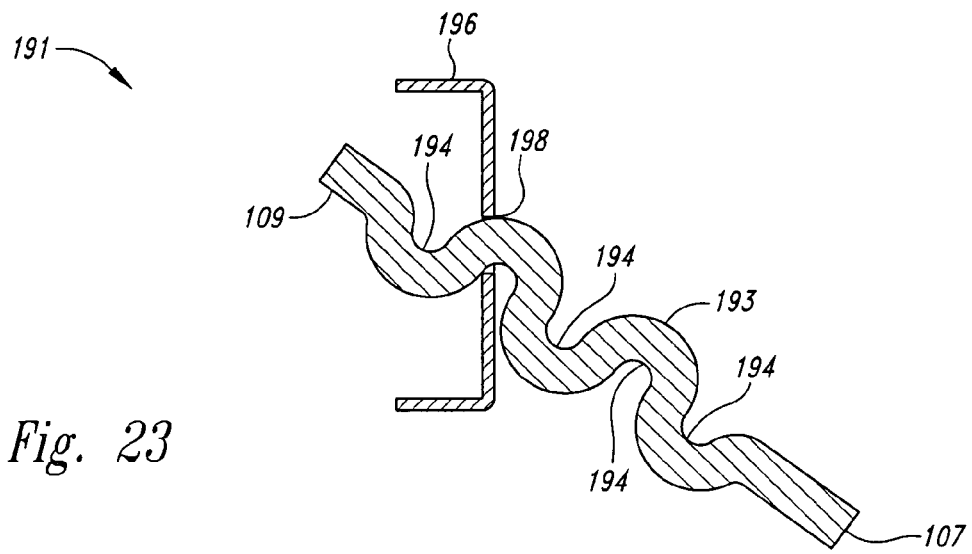
FIG. 23 is a side elevational view showing transitioning from a first slot to a second slot of the retaining bar of the ninth implementation for coupling with the patch panel of the ninth implementation.
Figure 24:
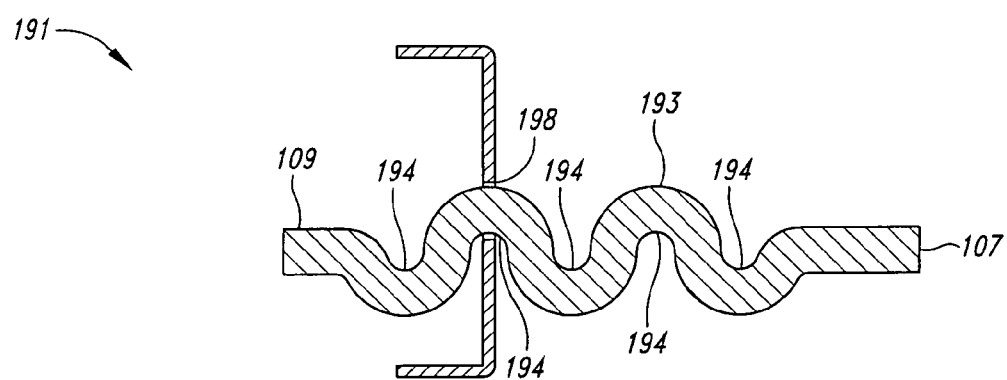
FIG. 24 is a side elevational view showing a second slot of the retaining bar of the ninth implementation being coupled with the patch panel of the ninth implementation.
Figure 25:
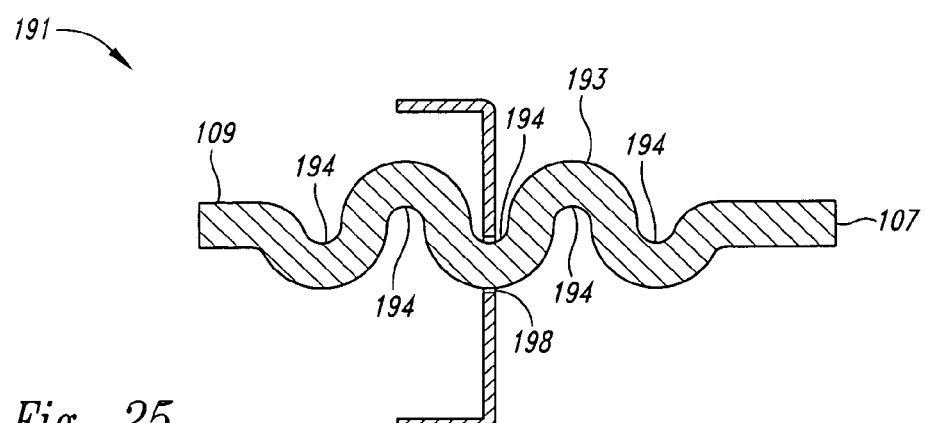
FIG. 25 is a side elevational view showing a third slot of the retaining bar of the ninth implementation being coupled with the patch panel of the ninth implementation.

A ninth implementation 191 of the cable retaining system is shown in FIGS. 18 and 19 with the bar 107 having serpentine shaped extensions 193 with slots 194 that couple the bar to a seventh patch panel 196 through engagement of the slots with the edge wall portions of openings 198 of the patch panel. In FIGS. 20-25, one of the extensions 193 is shown being progressively inserted into one of the openings 198 by pivoting the extension about the opening with an undulating movement as the extension proceeds into the opening. The extension 193 proceeds further into the opening 198 until a desired position is reached with one of the slots 194 being engaged with the edge wall portion of the opening 198 as shown in FIG. 25.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A retainer system comprising:
   a multiport equipment having at least two openings and at least two mounting holes;
   a retainer member with two extension portions and a lateral portion extending between the two extension portions, each of said extension portions including at least one hole;
   a pair of brackets, each of said brackets having an opening to receive a different one of the extension portions and a mounting opening, each of said brackets having at least one snap bearing to engage with the at least one hole of the different one of the extension portions;
   at least one cable stay, the cable stay having an elongated member with a groove and a plurality of cable clamps attached to the elongated member, the groove sized to couple with the lateral portion of the retainer member, the cable clamps each shaped and sized to retainably engage with a cable; and
   a plurality of fasteners, each of said fasteners receivable in one of the mounting holes and the mounting opening of one of the brackets to fasten the brackets to the multiport equipment with each of the openings of the brackets in alignment with one of the openings of the multiport equipment to receive one of the extension portions when the extension portions are received within the openings of the brackets and extend inward toward the multiport equipment.

2. The system of claim 1 wherein the multiport equipment has a center portion and wherein the lateral portion of the retainer member is bent, whereby the cable is directed away from the center portion when the cable is retainably engaged with one of the cable clamps of the cable stay.

3. The system of claim 1 wherein the lateral portion of the retainer member have at least two angled portions angled at an angle between 0 and 180 degrees to the other.

4. The system of claim 1 wherein each of a first portion of the cable clamps are arranged along the elongated member to be positioned above the lateral portion of the retainer member and each of a second portion of the cable clamps are arranged along the elongated member to be positioned below the lateral portion of the retainer member when the cable stay is coupled with the lateral portion of the retainer member.

5. The system of claim 1 wherein the two openings of the multiport equipment are accessible from a front of the equipment.

6. The system of claim 1 wherein the two openings of the multiport equipment are accessible from a rear of the equipment.

7. The system of claim 1 wherein the multiport equipment is a patch panel.

8. The system of claim 1 wherein the lateral portion of the retainer member is a bar.

9. A retainer system comprising:
   a multiport equipment having front and rear sides and at least two front openings on the front side and at least two rear openings on the rear side, and at least two mounting holes at the front side of the multiport equipment and at least two mounting holes at the rear side of the multiport equipment;
   a first retainer member with two extension portions and a lateral portion extending between the two extension portions, each of said extension portions of the first retainer member including at least one hole;
   a first pair of brackets, each of said first pair of brackets having an opening to receive a different one of the extension portions of the first retainer member and a mounting opening, each of said first pair of brackets having at least one snap bearing to engage with the at least one hole of the different one of the extension portions of the first retainer member;
   at least one first cable stay, the first cable stay having an elongated member with a groove and a plurality of cable clamps attached to the elongated member, the groove of the first cable stay sized to couple with the lateral portion of the first retainer member, the cable clamps of the first cable stay each shaped and sized to retainably engage with a cable;
   a plurality of first fasteners, each of said first fasteners receivable in one of the mounting holes at the front side of the multiport equipment and the mounting opening of one of the first pair of brackets to fasten the first pair of brackets to the front side of the multiport equipment with each of the openings of the first pair of brackets in alignment with one of the front openings of the multiport equipment to receive one of the extension portions of the first retainer member when the extension portions are received within the openings of the first pair of brackets and extend inward toward the multiport equipment;
   a second retainer member with two extension portions and a lateral portion extending between the two extension portions, each of said extension portions of the second retainer member including at least one hole;
   a second pair of brackets, each of said second pair of brackets having an opening to receive a different one of the extension portions of the second retainer member and a mounting opening, each of said second pair of brackets having at least one snap bearing to engage with the at least one hole of the different one of the extension portions of the second retainer member;
   at least one second cable stay, the second cable stay having an elongated member with a groove and a plurality of cable clamps attached to the elongated member, the groove of the second cable stay sized to couple with the lateral portion of the second retainer member, the cable clamps of the second cable stay each shaped and sized to retainably engage with a cable; and a plurality of second fasteners, each of said second fasteners receivable in one of the mounting holes at the rear side of the multiport equipment and the mounting opening of one of the second pair of brackets to fasten the second pair of brackets to the rear side of the multiport equipment with each of the openings of the second pair of brackets in alignment with one of the rear openings of the multiport equipment to receive one of the extension portions of the second retainer member when the extension portions are received within the openings of the second pair of brackets and extend inward toward the multiport equipment.

10. A retainer system comprising:

a multiport equipment having two attachment openings;

a retainer bar with two extension portions and a lateral portion extending between the two extension portions, the two extension portions coupled to the multiport equipment with each of said extension portions extendable into a different one of the two attachment openings of the multiport equipment; and at least one cable stay, the cable stay having an elongated member with a groove and a plurality of cable clamps attached to the elongated member, the groove sized to removably and slidably couple with the lateral portion of the retainer bar for selective lateral siding movement of the cable stay along the lateral portion of the retainer bar, as desired to locate the cable stay along the lateral portion at a desired location, the cable clamps each shaped and sized to retainably engage with a cable.

11. The system of claim 10 wherein the lateral portion of the retainer bar is bent to form at least two angled portions.

12. The system of claim 10 wherein a first portion of the cable clamps are positioned above the lateral portion of the retainer bar and a second portion of the cable clamps are positioned below the lateral portion of the retainer bar when the cable stay is coupled with the lateral portion of the retainer bar.

* * * * *

UNITED STATES PATENT AND TRADEMARK OFFICE
CERTIFICATE OF CORRECTION

PATENT NO.         : 7,534,958 B2                                        Page 1 of 1
APPLICATION NO.    : 11/375685
DATED              : May 19, 2009
INVENTOR(S)        : Patrick S. McNutt and Phillip Phung It is certified that error appears in the above-identified patent and that said Letters Patent is hereby corrected as shown below:

Column 3, line 4 should read: When only one of the first front retainer 102 and the Column 3, line 26 should read: the cable clamps can be different for the cable stays. In some Column 4, line 14 should read: 11. The second rear retainer 154 is angled at a first "bend" 144R, Column 4, line 41 should read: An "eighth" implementation 180 of the cable retaining system Column 4, line 46 should read: "eighth" implementation is constructed to engage a sixth patch Column 4, line 55 should read: In this "eighth" implemenation 180, the bar 107 is formed so Signed and Sealed this Eighth Day of September, 2009

David J. Kappos
*Director of the United States Patent and Trademark Office*